United States Patent
Motoda

[11] 3,986,924
[45] Oct. 19, 1976

[54] NUCLEAR REACTOR
[75] Inventor: Hiroshi Motoda, Kawasaki, Japan
[73] Assignee: Hitachi, Ltd., Japan
[22] Filed: Oct. 2, 1972
[21] Appl. No.: 294,201

[30] Foreign Application Priority Data
Oct. 1, 1971  Japan .............................. 46-76302

[52] U.S. Cl. ................................... 176/17; 176/30
[51] Int. Cl.² ............................................ G21C 1/00
[58] Field of Search .................... 176/17, 18, 30, 40

[56] References Cited
UNITED STATES PATENTS

| | | | |
|---|---|---|---|
| 3,252,867 | 5/1966 | Conley | 176/18 |
| 3,255,083 | 6/1966 | Klahr | 176/17 |
| 3,344,032 | 9/1967 | Vendryes et al. | 176/18 |
| 3,362,882 | 1/1968 | Sofer et al. | 176/18 |
| 3,591,453 | 7/1971 | Gratton | 176/18 |
| 3,640,844 | 2/1972 | Shank et al. | 176/18 |

*Primary Examiner*—Harvey E. Behrend
*Attorney, Agent, or Firm*—Craig & Antonelli

[57] ABSTRACT

A nuclear reactor of the type in which fissionable material is placed as fuel in the reactor core in such a manner as to provide the most effective utilization of the material, wherein a fuel assembly is divided into three concentric regions around the core center and is loaded with fuel in such a way that if, for convenience, the regions are named the first region, second region and third region, respectively, in the order of distance from the core center, the infinite multiplication factors in these regions will be such that the factor in the third region is smaller than that in the first region and that in the first region is smaller than that in the second region.

3 Claims, 6 Drawing Figures

NUCLEAR REACTOR

BACKGROUND OF THE INVENTION

This invention relates to a nuclear reactor of the type in which fissionable material is placed in the reactor core as fuel in such a way as to provide most effective and economical utilization of the material.

In general, operation of a nuclear reactor is carried out by controlling the excess reactivity of the fuel which is composed of fissionable materials loaded in the reactor core, by a neutron absorber mounted in the reactor. When the excess reactivity is reduced to zero, the reactor is temporarily shut down to perform refueling, that is, the used up fuel in the reactor core is removed and fresh fuel is charged. If need be, shuffling or rearranging of the used and fresh fuels may be performed in the reactor core to effectuate flattening of the power distribution.

Generally, it is of essential requirements for the most economical operation of a nuclear reactor, supposing a certain required fuel enrichment was given, to realize, firstly, optimization of the refueling schedule and, secondarily, optimization of controlling by use of control material, so as to minimize the amount of fuel required. Needless to say, the schemes for these two types of optimization are closely related to each other and cannot be treated separately from each other. So far, however, there is known no theoretically established method of realizing such optimizations to any satisfactory extent.

Heretofore, there has been popularly employed a uniform scatter refueling method which places emphasis on flattening of power distribution and in which, for achieving optimization of the refueling schedule, a fixed quantity of fuel (for example, ¼ of the entire amount of fuel) in the reactor core is withdrawn successively, beginning with the portion with higher extent of burn-up or use, and a corresponding quantity of fresh fuel is charged and scattered uniformly in the reactor core. In a simplest example of such system, the reactor core is divided into many units so that each unit consists of four fuel assemblies, and refueling is performed by discharging the fuel in each unit successively, beginning with the oldest fuel.

This refueling method features a simple refueling principle and minimized tendency of causing local power peaking as the fresh and old fuels are arranged alternately.

If refueling operation is continued according to such method, there is produced a situation in which burn-up or use of fuel is lowered proportionally to the distance from the center and hence the infinite multiplication factor becomes higher as the distance from the center increases. This is because the power distribution in the reactor core generally has a tendency to decline as the distance from the center increases. This promotes flattening of power as well as temperature distributions of fuel, and consequently, certain thermal allowance is provided.

However, such determined intra-reactor nuclear properties (such as infinite multiplication factor, material buckling, etc., which define the fission productivity) are not necessarily advantageous from the viewpoint of economical utilization (combustion or useful life) of the nuclear fuel.

Also, for performing initial fuel loading, there is employed either a method in which fuel of uniform enrichment is loaded evenly or a method in which, for ensuring flattening of power distribution, a fuel mixture of two to three different degrees of enrichment is loaded such that the fuel of higher enrichment is positioned on the outside. But, either of such methods proves unsatisfactory in always providing effective utilization of nuclear fuel.

On the other hand, for achieving optimization of control by the control material, there is generally employed a method in which a control rod pattern that will maintain power distribution constant during the operation is decided through a trial and error policy by controlling the reactor core uniformly with a liquid poison (such as aqueous solution of boron) or controlling the reactivity by a control rod.

In the study of the problems concerning the above-mentioned two types of optimization, controlling by control material may be regarded as a sub-problem concomitant to the refueling schedule, and it is hence considered that the solution of the latter problem will provide several times as greater effect of optimization than the solution of the former problem.

SUMMARY OF THE INVENTION

It is therefore an object of the present invention to provide a nuclear reactor core constitution specifically arranged to realize most effective utilization of fissionable materials as fuel.

It is another object of the present invention to provide a nuclear reactor core constitution of the type described, by theoretically elucidating the optimum nuclear property distribution, which has been equivocal in the past, from the standpoint of economical utilization of nuclear fuel, so as to determine a general principle for such optimization and adapt such principle in arrangement of fuel in the reactor core.

According to the present invention, there is provided a nuclear reactor in which the fuel assembly using fissionable material as fuel is divided into three concentric regions about the core center and is loaded with fuel such that, if the regions are named the inner (first) region, middle (second) region and outer (third) region in the order of distance from the core center, the infinite multiplication factor in each of said regions will be such that it is smaller in the outer region than in the inner region and smaller in the inner region than in the middle region, thereby realizing a fuel arrangement that provides the optimal nuclear property distribution.

DESCRIPTION OF THE PREFERRED EMBODIMENTS

Figure 1:
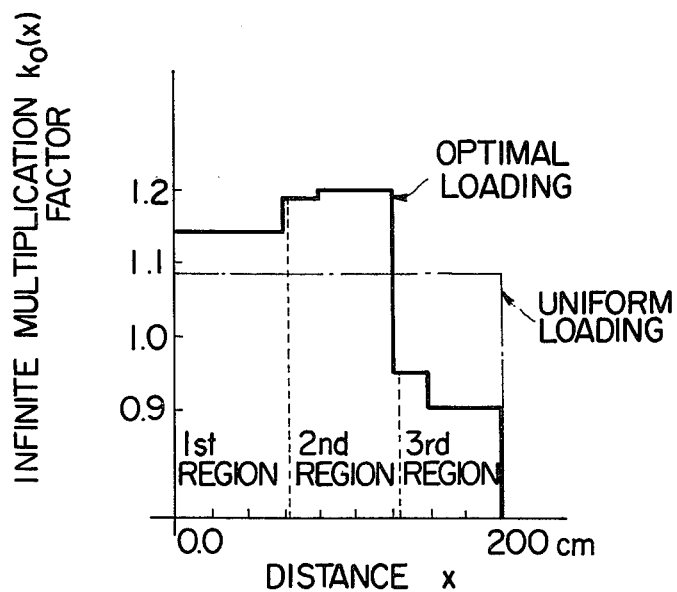
FIG. 1 is a characteristic diagram showing the optimal space distribution of infinite multiplication factor in the optimal nuclear fuel loading according to the present invention.

Before proceeding to the discussion on practical embodiments of the present invention, it will be of importance to describe here the basic principles of the invention.

Firstly, in order to accomplish the aforementioned objects of the invention, the problem of optimal fuel loading pattern is theoretically dealt with as follows.

Assuming that the one-dimensional one-group neutron diffusion equation can apply with neutron, the following formula is given:

$$M^2 \nabla^2 \phi(x,t) + (k_o(x) - a \cdot e(x,t) - 1 - u(x,t))\phi(x,t) = 0$$
$$0 \leq x \leq H, \quad 0 \leq t \leq tf \quad (1)$$

where:

| | |
|---|---|
| $M^2$ | neutron migration area (cm$^2$) |
| $\phi(x,t)$ | neutron flux (per cm$^2$. sec.) |
| $e(x,t)$ | burn-up (MWD/T) |
| $u(x,t)$ | control material enrichment (reactivity unit) |
| $k_o(t)$ | initial nuclear property (infinite multiplication factor) |
| a | depletion coefficient of property by fuel burn-up (reactivity/MWD/T) |
| x | spatial coordinate (cm) |
| H | core dimension (cm) |
| t | time (year) |
| tf | operation period (year) |

The burn-up or use increase in proportion to the neutron fluxes, hence:

$$\frac{\delta e(x,t)}{\delta t} = \phi(x,t) \quad (2)$$
$$0 \leq x \leq H, \quad 0 \leq t \leq tf$$

The boundary condition of the formula (1) is given as follows:

$$\frac{\delta \phi(o,t)}{\delta x} = o,$$
$$\frac{\delta \phi(H,t)}{\delta x} + \frac{1}{l}\phi(H,t) = 0$$
$$0 \leq t \leq tf \quad (3)$$

where $l$ stands for extrapolated distance provided by the reflector.

The initial condition of the formula (2) is:

$$e(x,o) = 0 \quad (4)$$
$$0 \leq x \leq H$$

The constraints include:
power definite condition given by:

$$\int_0^H \phi(x,t)dx = P, \quad 0 \leq t \leq tf \quad (5)$$

restriction of power peaking factor given by:

$$0 \leq \phi(x,t) \leq fp, \quad 0 \leq t \leq tf, \quad 0 \leq x \leq H \quad (6)$$

restriction of control material enrichment given by:

$$0 \leq u(x,t) \leq U, \quad 0 \leq t \leq tf, \quad o \leq x \leq H \quad (7)$$

and restriction of fuel property given by:

$$k \min \leq k_o(x) \leq k \max, \quad 0 \leq x \leq H \quad (8)$$

The performance index is:

$$J = \int_0^H k_o(x)dx \quad (9)$$

The problem is therefore how to determine $k_o(x)$ and $u(x,t)$ which satisfy the formulae (1) to (8) and minimize the formula (9).

In order to solve this problem, the formulae (1) to (9) are discretized concerning time and space and converted into a non-linear programming problem. If the space is equally divided into N − 1 number of sections and the time into M − 1 number of sections with the variables at the n-minute point and at the m-hour point being expressed by letters n and m, respectively, the formulae (1) to (9) may be unified into a non-linear constraint equation of the following formula (10):

$$g(ko.n, \phi n.m, en.m, un.m) \leq 0 \quad (10)$$
$$n = 1 \sim N, \quad m = 1 \sim M$$

Likewise, the formula (9) may be defined as follows:

$$J = f(ko.n) \quad n = 1 \sim N \quad (11)$$

The non-linear programming problem in the formulae (10) and (11) can be solved by using an approximation programming method. If the feasible solution that satisfies the formula (10) is expressed by letter o and the formulae (10) and (11) are linearized around such feasible solution, with the variables being expressed by x collectively, then the following equations are given:

$$\left.\frac{\delta g}{\delta x}\right|_{x=xo} \delta x \leq -g(xo)$$

$$\delta J = \left.\frac{\delta f}{\delta x}\right|_{x=xo} \delta x \quad (12)$$

where $\delta x$ stands for small variation of $x$. It will be noted that the formula (12) presents a linear programming problem concerning the variable $\delta x$. There is need of imposing a certain restriction to the range of variation of the variable $\delta x$ for bettering accuracy of linearization, but even if such matter is considered, no change is made in that a linear programming problem is presented.

$$A \delta x \leq B \quad \delta J = C \delta x \quad (13)$$

After all, solution to the optimization problems in the formulae (1) to (9) is obtained by repetitively solving the linear programming problem in the form of formula (13).

FIG. 1 shows, in graphical representation, the results obtained from application of the above-described method to a light water moderated power reactor under the following conditions: $l = 0.0$ cm, H = 200 cm, $M^2 = 80$ cm$^2$, P = H, $fp = 1.4$, $tf = 1$ year, V = 0.5, $k$ min = 0.9, and $k$ max = 1.2. In FIG. 1, the solid line represents the optimal loading. What is most typical of these results is that the reactor core is divided into three regions of almost equal volume, with the following relations being established: $k_o(x) = k$ max in the second region and $k_o(x) = k$ min in the third region. In the first region, $k_o(x)$ is of a constant value which is greater than $k$ min but smaller than $k$ max ($k$ min < $k_o(x)$ < $k$ max), and its value is determined by the power peaking factor.

In Table 1 below, three examples of combined methods for fuel loading and control rod programming are compared. The first example is based on the combination of optimal loading and optimal control rod programming which were obtained in the above-described method. The second example uses optimal solution only for loading and a conventional constant power shape method for control rod programming. The third example employs the optimal loading of the first example, which was uniformly homogenized in the core as shown by dotted lines in FIG. 1, while employing a constant power shape method for control rod programming.

Table 1

|  | Δt: difference of operation feasible period | Δk: difference of loaded fuel infinite multiplication factor |
|---|---|---|
| Optimal loading and optimal control rod programming | 0.00 | 0.00 |
| Optimal loading and constant power shape controlling | −0.01 | 0.0013 |
| Uniform loading and constant power shape controlling | −0.45 | — |

The numerical values in the left column in the above table compare the operation feasible time (burn-up time), showing that if the loading is optimal, the effect of optimization of control rod programming is only about 1%, while the difference of loading method can produce as high as 45% optimization effect. The numeral figures in the right column of Table 1 show the difference of loaded fuel infinite multiplication factor in case the operating time is one year. These results are indicative of extremely high effect of optimal loading.

The general characteristics concomitant to optimal loading have been described above, but when including approximate optimal loading in consideration of its prominent effect, the general characteristics may be educed in the following way. Namely, when the reactor core is tentatively divided into equal-volume sections, it is essential that the fuel is loaded in such a manner that the average nuclear property in the regions will be arranged in the order of 2- 1- 3 from the core center.

Now, the present invention is described in further detail by way of its preferred embodiments.

Figure 2:
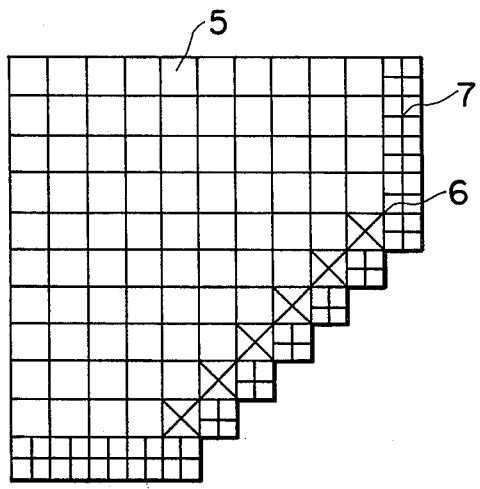
FIG. 2 is a planar development showing flow distribution in a ¼ reactor core according to an embodiment of the present invention.

FIG. 2 is a plane view of the core portion of a nuclear reactor, depicting the rate of distribution of the coolant flow through an orifice. It shows the flow rate of each fuel assembly as measured with the rated flow being given as 1.0. It will be understood that the Regions 5, 6 and 7 have flow rates of 1.127, 0.62 and 0.55, respectively. Flow distribution is so made that the coolant flow will be reduced at the core end where the power density is low because the power distribution will not be uniform in the reactor core. One section corresponds to one fuel assembly. The drawing shows only a ¼ type core. There are total 400 pieces of fuel assemblies in the entire core.

Figure 3:
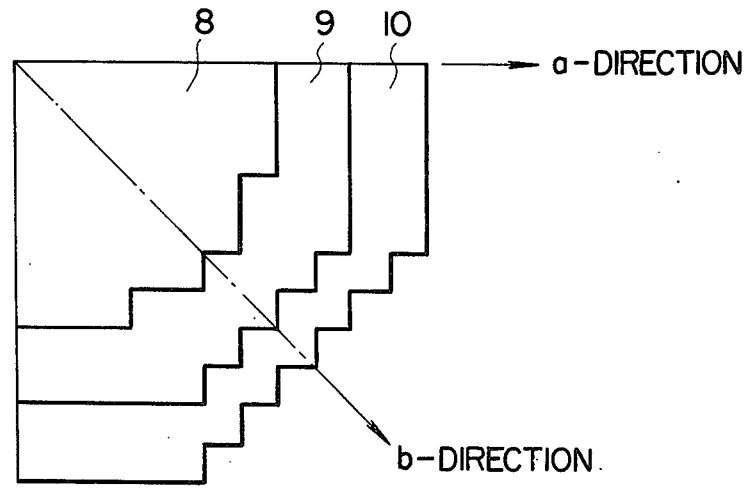
FIG. 3 is a chart showing a pattern of fuel loading according to an embodiment of the present invention.

FIG. 3 shows the fuel loading method according to the present invention, where Region 8 (first region counted from the core center), Region 9 (second region) and Region 10 (third region) are loaded with 164 (41 × 4) fuel assemblies, 120 (30 × 4) fuel assemblies and 116 (29 × 4) fuel assemblies, respectively. That is, they are loaded with fuel of different enrichments —2.09 w/o weight per cent and 1.83 w/o, respectively. The corresponding infinite multiplication factors are 1.119, 1.200 and 1.035, respectively.

Figure 4:
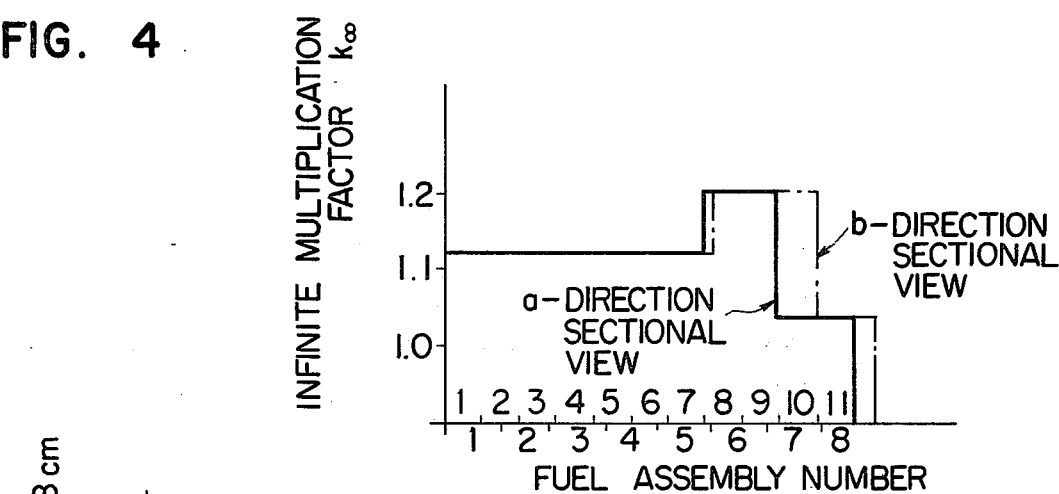
FIG. 4 is a graphical representation of FIG. 3.

FIG. 4 is a diagrammatic demonstration of the above infinite multiplication factors as considered in relation to the respective fuel assemblies in the a- and b-directions on the plane (longitudinal) of FIG. 3.

The operative performance obtained from this embodiment of the invention is shown comparatively with that from a conventional example in Table 2 below.

Table 2

|  | Conventional example | Present embodiment |
|---|---|---|
| Burn-up GWD/T | 5.575 | 6.785 |
| Difference % | — | 21.70 |
| Power peaking factor* | 2.523 | 2.398 |
| Location of peak | (1,1,3) | (4,7,2) |
| Minimum critical heat flux ratio | 3.3096 | 3.4820 |
| Location of minimum critical heat flux | (1,1,3) | (4,7,2) |
| Maximum linear power generation kw/ft | 13.211 | 12.557 |
| Effective multiplication factor | 0.99972 | 1.00037 |
| Average infinite multiplication factor | 1.0448 | 1.0348 |

*Local power peaking factor of 1.257 and over-power (10%) peaking factor of 1.100 are included.

Here the constant power shape method is used for control rod programming. The conventional example in the above table was given to clarify the actual effects of the embodiment of the present invention, and where the same fuel is used in the first region was loaded uniformly in the reactor core, and also the average value of infinite multiplication factor in the reactor core was selected same as in the instant embodiment of the present invention so as to ensure a valid comparison.

The above results dictate that the instant embodiment of the present invention provides surprising 21.7% higher burn-up than the conventional example and also produces more flattened power distribution and better thermal characteristics.

Figure 5:
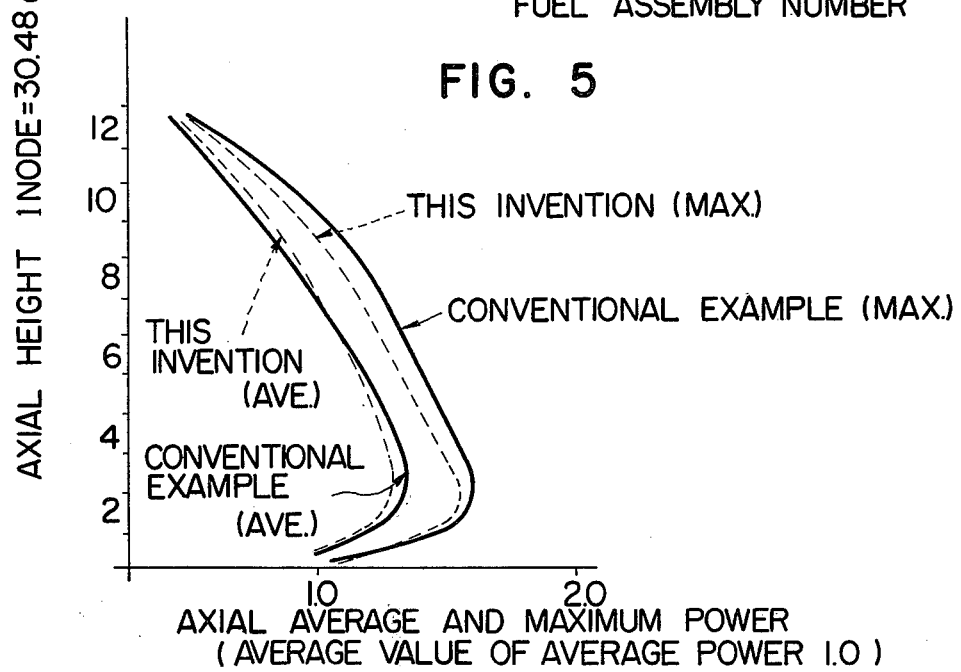
FIG. 5 is a characteristic diagram showing the average power distribution and the maximum power distribution, as observed in the axial direction, according to an embodiment of the present invention.
Figure 6:
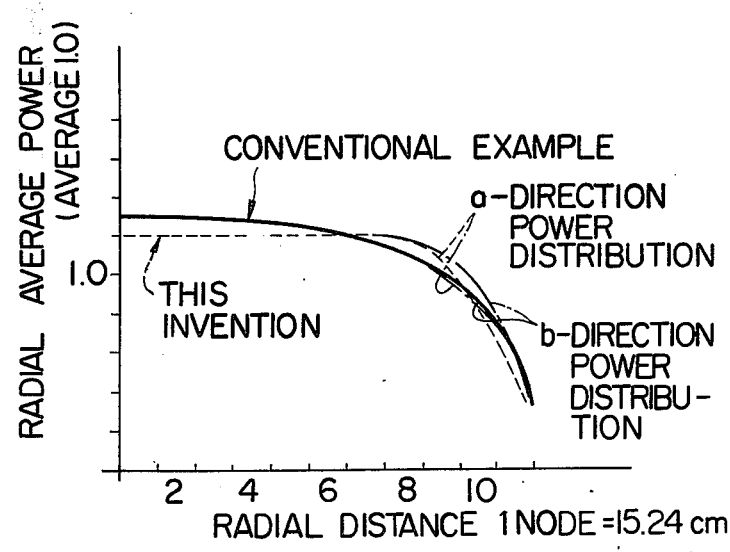
FIG. 6 is a characteristic diagram showing the power distributions (in the $a$- and $b$-directions) as observed radially, further embodying the present invention.

FIGS. 5 and 6 show power distributions, as viewed in the axial and radial directions of the core, according to the present invention and a conventional example. The difference between the two is most apparent at the core periphery, where the present invention develops more flattened power distribution than the conventional example.

As reviewed above, the present invention provides far better thermal characteristics and as much as about 20% higher burn-up than the conventional example, in spite of the fact that the same amount of fissionable material is loaded in the reactor core. This allows appreciable economization of the fuel cost, rendering a great contribution and benefit to the industries concerned.

While the novel embodiments of the invention have been described, it will be understood that various omissions, modifications and changes in these embodiments may be made by one skilled in the art without departing from the spirit and scope of the invention.

What is claimed is:

1. In a nuclear reactor having a core containing fissionable materials as fuel, the improvement which comprises a reactor core arrangement that is divided into three concentric regions of fuel assemblies including a first region, a second region, and a third region from the core center, said first region being positioned in the center of the core, said third region being positioned at the outer periphery of the core and said second region being positioned between said first and third regions, and the loading of fuel assemblies being such that said third region is smaller in its infinite multiplication factor than that of said first region and said first region is smaller in its infinite multiplication factor that that of said second region, and said three regions being of almost equal volume.

2. The reactor of claim 1 in which the second region contacts the first and third regions.

3. In a nuclear reactor having a core containing fissionable materials as fuel, the improvement which comprises a reactor core arrangement made up of three concentric regions of fuel assemblies, including a first region, a second region, and a third region from the core center, the loading of fuel assemblies being such that said first region, which is positioned in the center of the core, will be smaller in its infinite multiplication factor than that of said second region, such that said third region, which is positioned at the outer periphery of the core, will be smaller in its infinite multiplication factor than that of said first region, and such that said second region, which is positioned between said first and third regions, will be higher in its infinite multiplication factor to any of said first and third regions, the three regions being of almost equal volume.

* * * * *